United States Patent [19]

Ohba et al.

[11] Patent Number: 5,168,496
[45] Date of Patent: Dec. 1, 1992

[54] SYSTEM FOR INTERNETWORK COMMUNICATION BETWEEN LOCAL AREAS NETWORKS

[75] Inventors: Toshimitsu Ohba, Kawasaki; Shigehiro Hayashi, Owariasahi, both of Japan

[73] Assignee: Fujitsu Ltd., Kawasaki, Japan

[21] Appl. No.: 845,539

[22] Filed: Mar. 4, 1992

Related U.S. Application Data

[63] Continuation of Ser. No. 452,397, Dec. 19, 1989, abandoned.

[30] Foreign Application Priority Data

Dec. 20, 1988 [JP] Japan .................. 63-325054
Dec. 28, 1988 [JP] Japan .................. 63-332394
Jan. 18, 1989 [JP] Japan .................... 1-10378

[51] Int. Cl.⁵ ............................. H04J 3/02
[52] U.S. Cl. ................. 370/85.14; 370/85.5
[58] Field of Search ........... 370/85.14, 85.13, 85.12, 370/85.4, 82, 60, 94.1, 94.2, 85.5

[56] References Cited

U.S. PATENT DOCUMENTS

| | | | |
|---|---|---|---|
| 3,890,471 | 6/1975 | Hachenburg | 370/85.14 |
| 4,287,592 | 9/1981 | Paulish | 370/85.14 |
| 4,680,756 | 7/1987 | Sugimoto et al. | 370/88 |
| 4,683,563 | 7/1987 | Rouse | 370/85.14 |
| 4,922,503 | 5/1990 | Leone | 370/85.13 |
| 4,947,390 | 8/1990 | Sheehy | 370/85.13 |

FOREIGN PATENT DOCUMENTS 60-10839 1/1985 Japan .
61-84940 4/1986 Japan .
2171880A 9/1986 United Kingdom .

OTHER PUBLICATIONS

Daniel T. W. Sze, "A Metropolitan Area Network", IEEE Journal on Selected Areas in Communications, vol. SAC-3, No. 6, pp. 815-824, N.Y., U.S.A.
ANSI/IEEE Std. 802.5-1985 ISO/DP 8802/5, American National Standard Local Area Networks 8025, ANSI/IEEE Standard ISO Draft Proposal, Token Ring Access Method (Mar. 1985).
X3T9/85-X3T9.5/84-49 REV-4.0, FDDI Station Management (SMT), Draft Proposed American National Standard (Aug. 1, 1988).
"Token Ring Access Method and Physical Layer Specification", ANSI/IEEE Std. 802.5-1985, IEEE (Apr. 1985).
M. Lee: "FDDI-II, Working Paper", ANSI X3T9 (May 1986).
ANSI/IEEE Std. 802.5-1989, IEEE Standards for Local Area Networks, Token Ring Access Method and Physical Layer Specifications (Sep. 29, 1989).
ISO 9314-2:1989, International Standard, Information Processing Systems—Fibre Distributed Data Interface (FDDI)—Part 2: Token Ring Media Access Control (MAC).
ASC Technical Committee, X3Y9.5, Jun. 16, 1987, FDDI-II Working Paper.
"SUPERNET for Fiber Distributed Data Interface", Advanced Micro Devices, Feb. 1988.

Primary Examiner—Douglas W. Olms
Assistant Examiner—T. Samuel
Attorney, Agent, or Firm—Staas & Halsey

[57] ABSTRACT

An internetwork communication system provides communication from a first local area network to a second, ring-type, local area network via a bridge. The bridge receives a frame from the first local area network and transmits a dummy frame followed by a transfer frame to the second local area network. The transfer frame defines a node of the second local area network as a distant apparatus (receiver) and a node of the first local area network as a self apparatus (sender). The bridge later receives the dummy frame from the second local area network, after transmission of the dummy frame around the ring, and deletes the dummy frame and the transfer frame received following the dummy frame so that the communication in the second local area network does not circulate indefinitely around the ring. As an alternative to using a dummy frame, the bridge can receive the transfer frame, after circulation around the second local area network, and compare the distant apparatus of the received internetwork transfer frame with a stored distant apparatus address. When the received distant apparatus address matches the stored distant apparatus address, the bridge deletes the transfer frame from the second local area network.

20 Claims, 15 Drawing Sheets

SYSTEM FOR INTERNETWORK COMMUNICATION BETWEEN LOCAL AREAS NETWORKS

This application is a continuation of application Ser. No. 07/452,397, filed Dec. 19, 1989, now abandoned.

BACKGROUND OF THE INVENTION

1. Field of the Invention

This invention relates to communication between different networks and, more particularly, to communication between a plurality of local area networks (LANs) including ring-type LANs and, even more particularly, to communication between different networks by detecting a transfer frame circulation in a ring-type LAN.

2. Description of the Related Art

As demand grows for integration of data processing and communication systems, applications for the use of local area networks (LANs) are increasing. Currently, LAN standards are being investigated by the Institute of Electrical and Electronic Engineers (IEEE), the American National Standards Institute (ANSI) and the International Organization for Standardization (ISO), among others, and some standard LANs have already been proposed.

Some known LANs use a standard ring-type topology. A popular ring-type LAN is the token ring or Fiber Distributed Data Interface (FDDI) system controlled by a media access control (MAC) system. In this system, the right of transmission is shifted between nodes by circulating a control frame call token throughout the network. A node desiring to send at least one frame, waits to seize the token. After seizing the token, the node first transmits the frames to be sent and then, to transfer the right of transmission to the next node on the ring, retransmits the token after transmission of the frames. The node later receives the frames after they have circulated around the ring and does not retransmit them, thus eliminating the frames from the ring.

Previously, all information processing devices such as host and terminal units had to be assigned to the same LAN. With an increasing number of information processing devices and applications demanding interaction with one another, accommodation of all information units within only one LAN can be difficult if not impossible. In addition, realizing different application fields and processes on only one LAN is inadequate from the point of view of function and performance. Therefore, more than one LAN is sometimes installed by a LAN user.

A requirement remains for effective transmission of data from a node of one LAN to a node of another LAN. For the control of communication between different types of LANs, a flexible and low cost system for communication between different LANs is needed.

The present invention provides a system for internetwork communications between different types of LANs not heretofore possible. FIG. 1 shows an example of a conventional network structure for mutual connection between two LANs. The network connects LAN I and LAN II through bridge 1, the interface for communication between different networks. Nodes 2, 3 and 4 belong to LAN I and nodes 5, 6 and 7 belong to LAN II in the example of FIG. 1. Bridge 1 is also a node belonging to both LANs I and II and functions as a media access control (MAC) bridge for controlling transmission and reception of internetwork transfer frames, for internetwork mutual communication between, for example, the nodes 3 and 5. Internetwork communication between other LAN nodes is thus possible.

FIG. 2 shows an example of another conventional network structure in which a plurality of networks are mutually connected. Ring-type LAN III is a token ring LAN provided with bridge stations 8 and 9 as well as nodes 10 and 11. LAN III is connected with LANs IV and V through bridge stations 8 and 9. LAN IV is provided with terminals 12, 13, 14 and LAN V is provided with terminals 15, 16, 17. Mutual internetwork communication of internetwork frames over LANs III, IV and V is carried out through bridge stations 8 and 9.

FIG. 3 shows a conventional frame format applied to the Fiber Distributed Data Interface (FDDI) type of LAN. As shown in FIG. 3, each frame is composed of a plurality of fields: a phase synchronization (preamble) PA, a start delimiter SD, a frame control FC, a distant apparatus (destination node) address DA, a self apparatus (start node) address SA, an information part INFO, a frame check sequence FCS, an end delimiter ED, and a frame status FS. The phase synchronization PA is used for phase synchronization upon reception; the start delimiter SD is used for indicating the frame start position; and the end delimiter ED is used for indicating the frame end position.

A node of the known Fiber Distributed Data Interface (FDDI) type of LAN erases and will not retransmit a received frame when the self apparatus (start node) address SA of the received frame matches the address of the node because the node assumes the frame is a frame previously transmitted by itself. Similarly, in Japanese Laid-open patent application (Kokai) No. 61-084940, filed Nov. 11, 1983 and published Jun. 8, 1985 in Japan, after a circulation time has passed since a frame was transmitted from a system node, the received frame is erased without retransmission, because the node assumes the received frame is the frame previously transmitted by itself. However, when bridge 1 or bridges 8 and 9 are shown in FIGS. 1 or 2 are operated like ordinary nodes for intranetwork communication, as above, internetwork communication problems occur.

Problems occur in the internetwork mutual connection network of FIG. 1, for example, when a frame including the self apparatus (start node) address SA, for example, the address of node 3, and the distant apparatus (destination node) address DA, for example, the address of node 5, is formed and transmitted to the LAN I from the node 3, for example, to transfer the frame to node 5 of LAN II from node 3 of LAN I through bridge 1. The frame received by bridge 1, is sent to LAN II causing the desired node 5 to receive it. Bridge 1 then automatically erases the internetwork transfer frame after it has circulated the ring of LAN II. However, when bridge 1 is structured to operate like the ordinary nodes, as described above, problems occur in the event the self apparatus (start node) address SA in the received frame matches the node number or address of bridge 1. The transmitted frame is erroneously erased by bridge 1. Accordingly, the internetwork transfer frame having the self apparatus node address SA=3 cannot be erased from the LAN II and this transfer frame continuously circulates in LAN II. This also occurs when the frame is transferred to nodes 2, 3 or 4 in LAN I from the nodes 5, 6, or 7 in LAN II.

A frame used in a method of formatting a received frame is illustrated in Prior Art FIG. 4. Using the frame illustrated in FIG. 3, when bridge 1 receives a frame transferred to node 5 from node 3, the distant apparatus node address DA in the transfer frame is the address of node 5 and the self apparatus node address SA is the address of node 3. In node 1, the frame is formatted as illustrated in FIG. 4, information $INFO_1$ is defined as part of information $INFO_2$ which also includes the original destination DA and start SA addresses; self apparatus node address SA is assigned to the address of bridge 1; and distant apparatus node address DA is assigned to the address of node 5. This new transfer frame is transmitted to the LAN II by bridge 1. In this case, the receiving node 5 (distant apparatus) analyzes the content of information part $INFO_2$ in the received frame to determine that the self apparatus node address SA is the address of node 3. Each node in a LAN using this type of internetwork communication is required to provide not only the self apparatus address SA, but also the ability to analyze the self apparatus from the content of $INFO_2$ to deal with two kinds of frame format illustrated in FIGS. 3 and 4. As a result, a more complicated system is required.

When using a counter to monitor the receiving timing of a frame transmitted from the self apparatus in order to erase the frame, complicated procedures are necessary for changing the ring circulation time of all nodes, node by node, due to addition and erasure of a node in the network.

SUMMARY OF THE INVENTION

An object of the present invention is to provide an internetwork connecting unit which does not require modification of frame format for internetwork transfer between connected LANs.

Another object of the present invention is to provide a internetwork connecting unit unaffected by network structure modification.

To achieve the foregoing objects and features of the invention, there is provided a system for communication between different networks by controlling communication between local area networks including a ring-type local area network which operates by transmitting a dummy frame followed by a transfer frame to the ring-type local area network. The transfer frame contains data defining a node of the ring-type local area network as a distant apparatus (receiver) and a node of another local area network as a self apparatus (sender). The dummy frame is detected on the ring-type local area network, after transmission of the dummy frame around the ring, and the internetwork transfer frame received following the dummy frame from the ring-type local area network deleted. Thus, communication transfer between networks is achieved.

Also provided is a system for communication between different local area networks including at least a ring-type local area network. A transfer frame defines a node of the ring-type local area network as the distant apparatus address and a node of another local area network as a self apparatus address. The transfer frame is transmitted to the ring-type local area network. The distant apparatus address of the transfer frame is received, after circulation around the ring-type local area network, and compared to the stored distant apparatus address. When the received distant apparatus address matches the stored distant apparatus address, the transfer frame is deleted from the ring-type local area network. Thus, communication between networks is similarly achieved.

DESCRIPTION OF THE PREFERRED EMBODIMENTS

Figure 5:
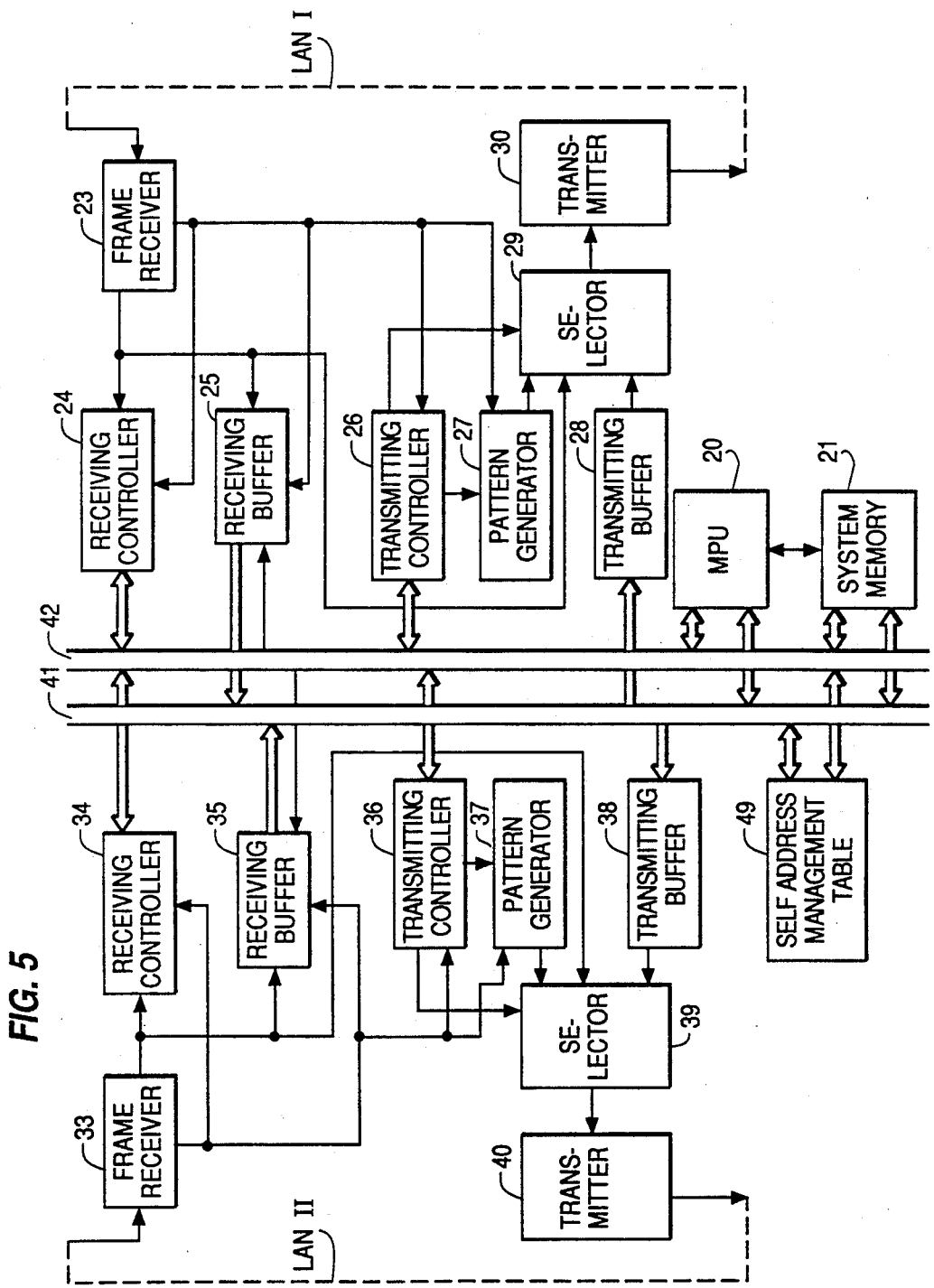
FIG. 5 is a block diagram of a connection system between different networks according to the first embodiment of the present invention.

FIG. 5 is a block diagram of an internetwork connecting unit according to a first embodiment of the present invention. An example will be described for receiving the internetwork transfer frame at node 5 of LAN II transmitted from node 3 of LAN I via bridge 1. The internetwork connection unit, bridge 1, for transmitting or receiving frames between LAN I and LAN II is described below with reference to FIG. 5.

Figure 3:
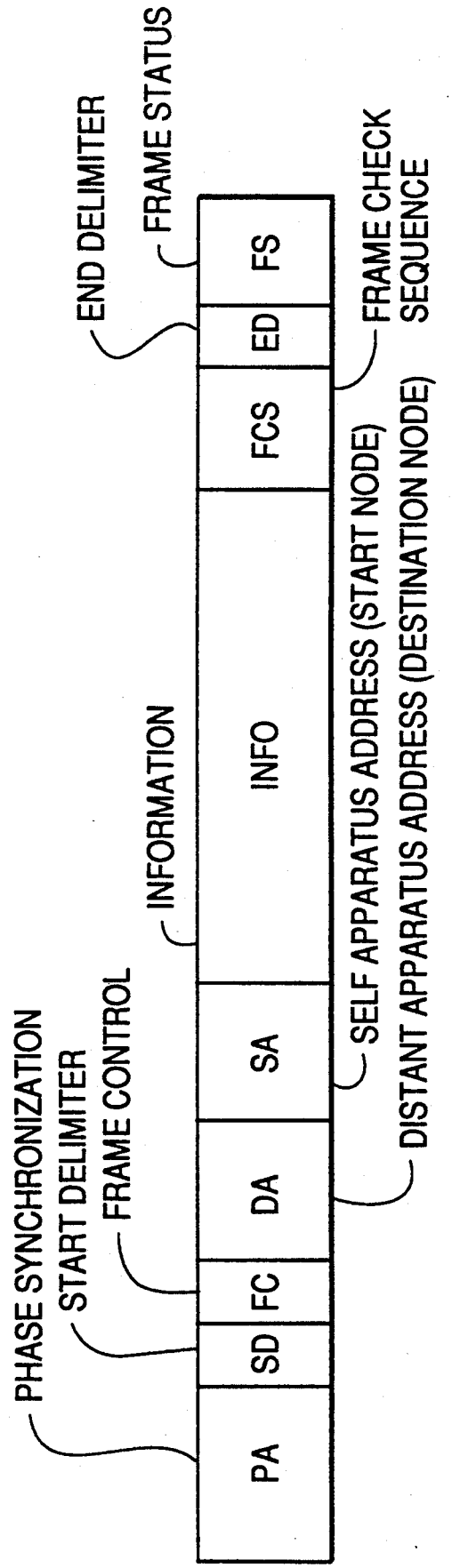
FIG. 3 is a prior art frame format for a FDDI type local area network.
Figure 4:
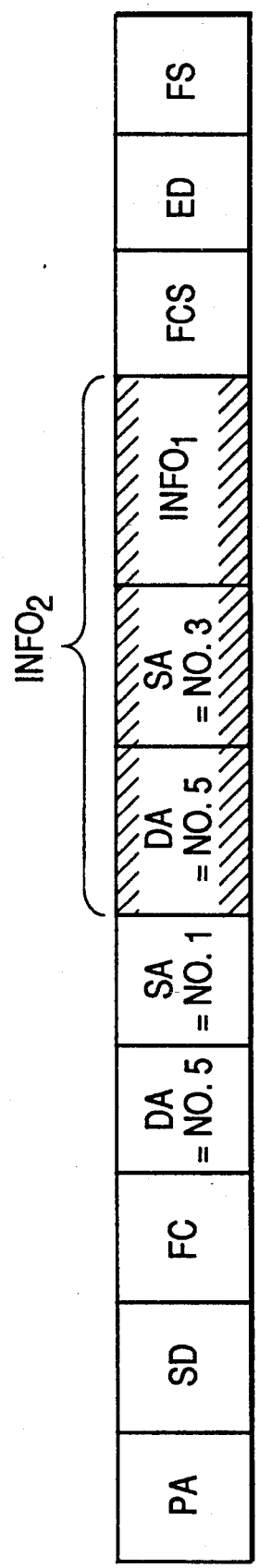
FIG. 4 is a prior art frame format for transferring a frame between different networks.

The frame transmitted from node 3 of LAN I is received by frame receiver 23 and a timing signal is generated in accordance with the phase synchronization read from phase synchronization PA of the frame (see FIG. 3). The received frame in frame receiver 23 is supplied to receiving controller 24, receiving buffer 25 and selector 29 and is stored in receiving buffer 25. Receiving controller 24 detects the start delimiter SD of the received frame through the timing control of frame receiver 23, identifies the distant apparatus address DA and self apparatus address SA in the received frame and then forwards these addresses to microprocessor (MPU) 20 through control bus 42. Under the control of microprocessor 20, the received frame in the receiving buffer 25 is transferred to the system memory 21 via data bus 41.

System memory 21 stores control information, such as frame format information, format conversion information for LAN I and LAN II, and address information of nodes 2 through 7 of LAN I and LAN II. System memory 21 also stores transfer frames from receiving buffer 25. The MPU 20 refers to the node address information of system memory 21 to decide whether the distant apparatus address DA sent from the receiving controller 24 belongs to LAN I or LAN II. The decisions made based on self apparatus address SA will be described later.

In the event the MPU 20 determines that the destination address DA corresponds to a node belonging the same LAN (LAN I), the received frame is sent directly to LAN I, as described below. Selector 29 is normally set to select the output of frame receiver 23, although it can be switched to pattern generator 27 or to transmitting buffer 28 under control of transmitting controller 26 in response to a signal from MPU 20 or frame receiver 23. Therefore, a frame received by the frame receiver 23 can be sent directly to LAN I by frame transmitter 30 after passing through selector 29. Namely, the frame transmitted from node 3 passes through bridge 1 and MPU 20 clears the received frame stored in the receiving buffer 25

In the event the MPU 20 determines that the destination address DA corresponds to a node in LAN II, the frame received from LAN I is forwarded in the transfer frame for LAN II, as described below. Microprocessor 20 must convert, upon transfer of the received frame to the LAN II from the LAN I, the frame format of the received frame stored in the system memory 21 to the frame format used in the LAN II. Therefore, MPU 20 reads out the received frame from system memory 21 and converts the received frame into the format used in LAN II b referring to the format information stored in the system memory 20. The received frame after conversion, is transferred to transmitting buffer 38 through the data bus 41. Microprocessor 20 then instructs receiving controller 34 to seize the token circulating in LAN II to acquire the right of transmission on LAN II. Accordingly, the received frame is copied in the bridge 1 as the distant apparatus in LAN I and is then transmitted on LAN I again to circulate on LAN I toward the self apparatus node 3. The frame receiver 33, connected to LAN II, operates in the same way as the frame receiver 23 described above, wherein the received frame is input to the receiving controller 34, the receiving buffer 35 and the selector 39. When the token is detected in the receiving controller 34, the receiving controller 34 informs the MPU 20 via the control bus 42 of the seizure of the token. Thereby, the right of transmission on LAN II by the bridge 1 can be obtained.

In this case, the bridge 1 is the frame sender in LAN II. Therefore, when the transfer frame sent to LAN II from the transmitting buffer 38 circulates LAN II and is received again by the bridge 1, it must be deleted. That is, the transfer frame transmitted by the bridge 1 itself must be identified and, therefore, the bridge 1 provides a self apparatus address management table circuit 49. The MPU 20 accumulates and stores the self apparatus addresses SA of such transfer frames as the identifier (SA) in the self apparatus address management table circuit 49.

Moreover, the MPU 20 sends a command to the transmitting controller 36 to send the transfer frame including its corresponding identifier (transmitting frame) to LAN II. The transmitting controller 36 controls the selector 39 to select the output of the transmitting buffer 38. The transmitter 40 sends the transfer frame to LAN II.

This transfer frame is transmitted to LAN II from the transmitter 40 of the bridge 1. Thereafter, with the command from MPU 20, the transmitting controller 36 controls a pattern generator 37 and the selector 39 to select the output of the pattern generator 37. The pattern generator 37 generates the token pattern. As a result, the token is transmitted to LAN II from the pattern generator 37 through the selector 39 and transmitter 40. Thereby, the right of transmission is released and the MPU 20 controls the transmitting controller 36 so that the selector 39 can select the output of the frame receiver 33 as usual.

Thereafter, the transfer frame sent to LAN II from the bridge 1 is fetched by node 5, reaches again the bridge 1 by circulating LAN II and is received by the frame receiver 33. The address indicated by the self apparatus address SA of the transfer frame is transferred to MPU 20 through the control bus 42. Microprocessor 20 then refers to the self apparatus address management table circuit 49 to determine if the self apparatus address SA of this transferred frame is stored in the self apparatus address management table circuit 49.

When it is determined that the self apparatus address SA of the received frame is not stored in the self apparatus address management table circuit 49, the received frame is not the transfer frame to LAN II from LAN I transmitted on LAN II from the bridge 1 as the self apparatus. Accordingly, since selector 39 is switched to select the output of the frame receiver 33, the MPU 20 does not switch the selector 39 and the received frame is directly transmitted to LAN II from the transmitter 40. When it is determined that the self apparatus address SA of the received frame is stored in the self apparatus address management table circuit 49, MPU 20 identifies that the received frame is the transfer frame to be transferred between networks to the LAN II via the bridge 1, and thus erases (eliminates) this frame from circulation in the ring of LAN II.

To erase (eliminate) the transfer frame, MPU 20 sends a control signal to the transmitting controller 36. In order to replace the data illustrated in FIG. 3 after the self apparatus address SA of the received transfer frame, the transmitting controller 36 controls the selector 39 to select an output of the pattern generator 37 to send an idle pattern to the transmitter 40. Therefore, the data illustrated in FIG. 3, when the self apparatus address SA of the frame to be sent to LAN II is detected by the bridge 1 is replaced with the idle pattern and, thereby, erasure (elimination) of the frame sent from the self apparatus is complete. Such erasure (elimination) of the frame is called stripping.

Figure 6:
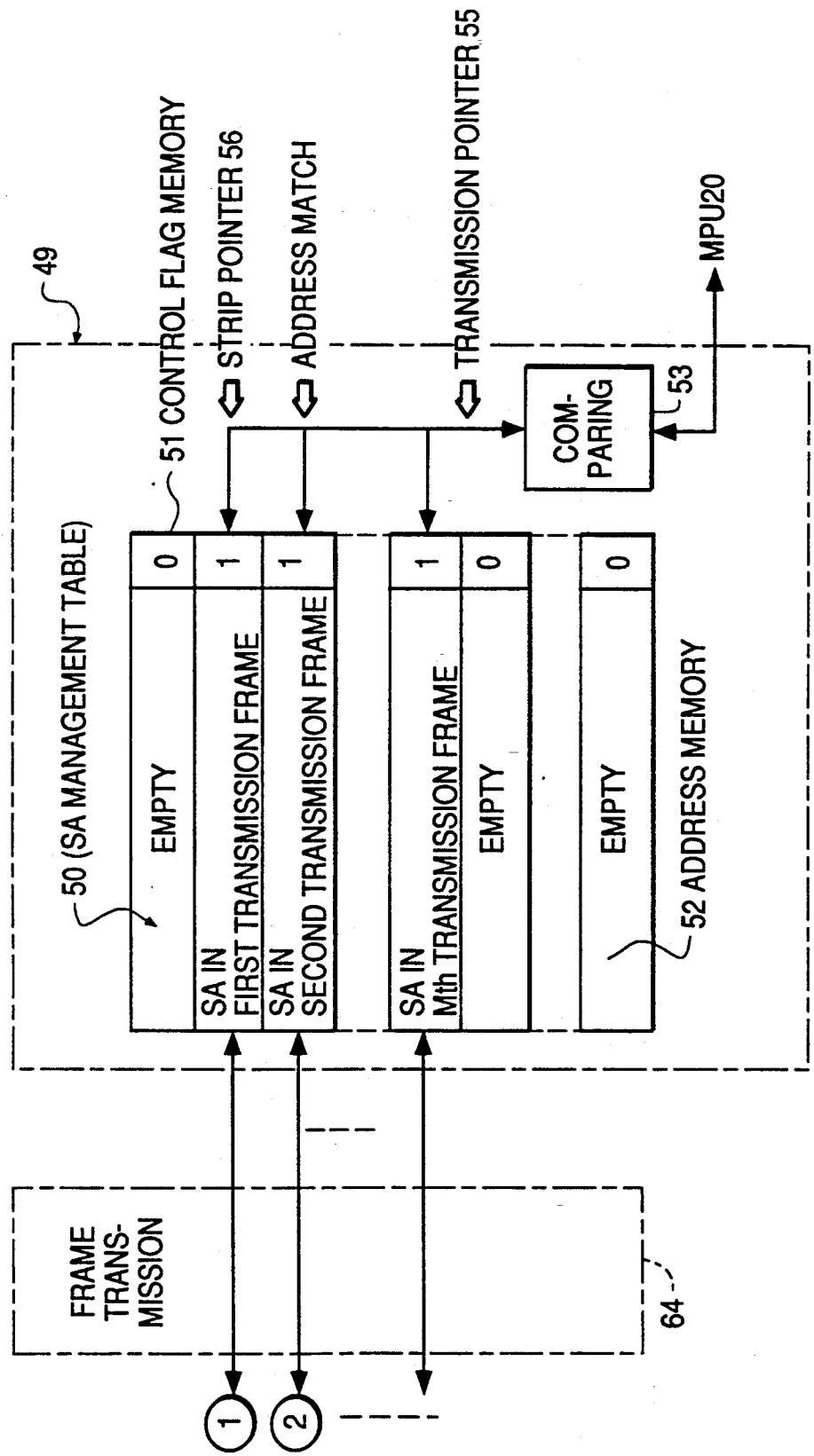
FIG. 6 is a block diagram of the self address management table of FIG. 5.

FIG. 6 is a block diagram of the self apparatus address management table circuit 49, described in detail below. The register in the SA management table 50 of self apparatus management table circuit 49 shown in FIG. 5 arranges flip-flops in columns of n+1 bits for each row. Address memories 52 are memory registers of n bits each, while control flags 51 are one bit memory registers. Each address memory 52 stores the self apparatus address of the transfer frame.

The state of control flag 51 indicates whether address memory 52 has registered a self apparatus address in that row. The flag is set (0→1) when the transfer frame is transmitted and reset (1→0) when the relevant transfer frame is received. A number of bits in each row of the control flag 51 are set based on control content. Moreover, the number of rows k of addresses 52 and control flags 51 (in SA mgmt table 50) are determined by considering the time t required for a transmitted frame to circulate through the LAN II, the average length l of the ring and the circulating speed v (bit rate) of the ring. The number of rows k in SA management table 50 is defined by the positive integer k obtained by the equation $k = t \cdot v / l$.

In the SA management table 50, the pointer indicates the row for reading and writing of address memory 52 and control flag memory 51. First-in-first-out (FIFO) reading and writing is preferably implemented by returning the pointer to the leading row when it reaches the ending row. A transmitting pointer 55 for frame transmission and a strip pointer 56 for frame stripping are used for this purpose. Transmitting pointer 55 points to the row to read the originating address of the next frame to be transmitted. Strip pointer 56 points to the row to read the originating address of the oldest unchecked transmitted frame.

When a transfer frame from node 3 of LAN I is passed to bridge 1 for node 5 of LAN II, an instruction is given to receiving controller 34 by MPU 20. When a token circulating in LAN II is received by receiving controller 34, receiving controller 34 informs MPU 20 of the reception. MPU 20 then forwards a control command to transmitting controller 36 and the transfer frame is transmitted to LAN I by transmitter 40. MPU 20 then detects the self apparatus address SA of the transmitting frame and writes it in the row of address memory 52 pointed to by transmitting pointer 55. The flag in the control flag memory 51 of the same row is set (0→1) and the transmitting pointer 55 is incremented to point to the next row.

Figure 7:
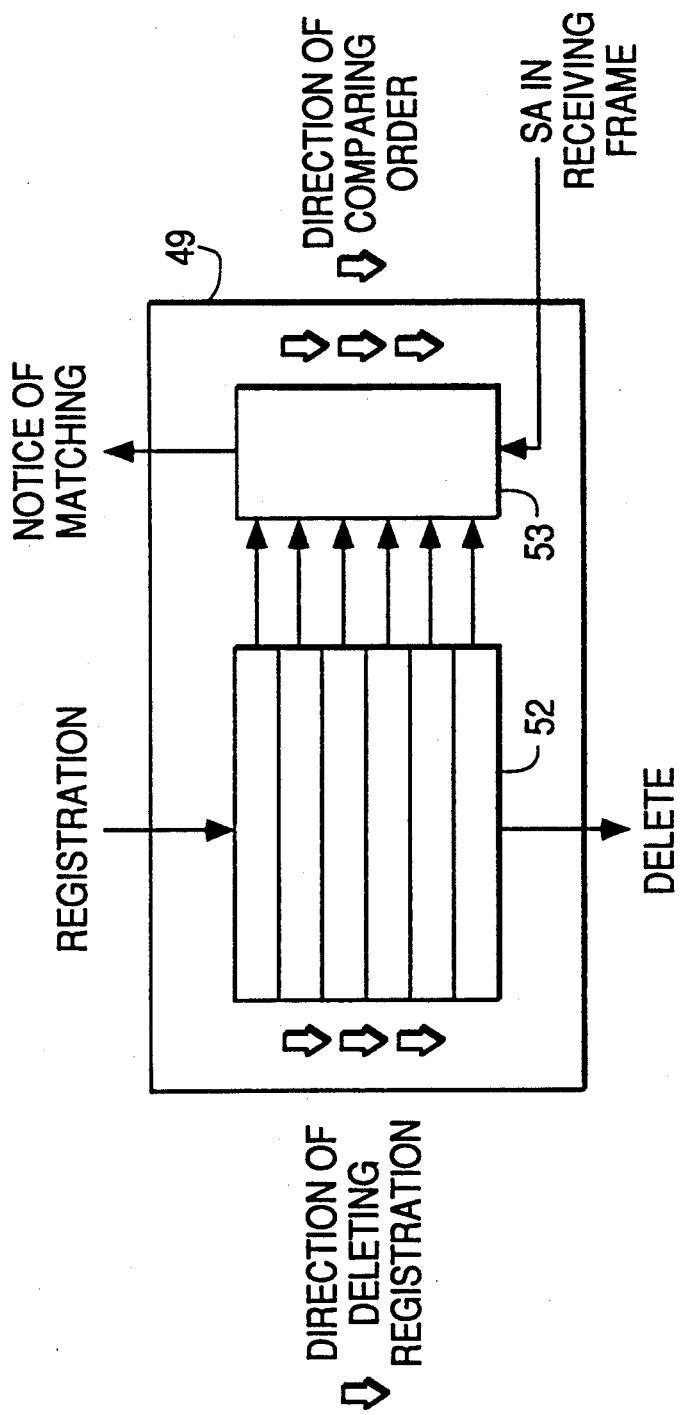
FIG. 7 is a block diagram illustrating the operation of the self address management table of FIG. 5.

Furthermore, different transfer frames from each node of the LAN I can be received by a plurality of bridges 1 and sequentially transmitted to the LAN II wherein self apparatus addresses SA for each transfer frame are stored in address memory 52 in a sequence indicated by the arrow of FIG. 7.

Accordingly, in case m transfer frames are transmitted, the self apparatus addresses of the m transfer frames are sequentially registered in address memory 52 as shown in FIG. 6 and a corresponding flag is set in the control flag memory 51 to indicate that the self apparatus addresses SA for the m transfer frame are stored in the SA management table 50.

The transfer frame transmitted to LAN II from the frame transmitter 40 circulates LAN II and is received again from LAN II in the frame receiving part 33. The self apparatus address SA of the transfer frame (the address of the node in LAN I) is then extracted from the transfer frame by MPU 20 via the receiving controller 34.

The self apparatus address SA extracted from the transfer frame is also input to a comparator 53 provided in the self apparatus address management table circuit 49. The comparator 53 retrieves all address memory rows for which the flags are set in the control flag memory 51 and reads the self apparatus addresses registered in the retrieved rows of address memory 52.

The comparator 53 recognizes matches between the self apparatus address read from the address memory 52 and the self apparatus address extracted from the transfer frame. When it is verified that the self apparatus address SA extracted from the transfer frame received from LAN II does not match any self apparatus address in address memory 52, the received frame is directly transmitted to LAN II through the frame transmitter 40 and the receiving buffer 35 is cleared. When the self apparatus address SA extracted from the transfer frame received from LAN II matches any self apparatus address stored in the address memory 52, the row indicated in the address memory 52 by the strip pointer 56 up to and including the row of the matching address are cleared by the comparator 53 and the strip pointer 56 is set to the row following the row containing the matching SA address.

When a bit error is not generated while the transfer frame sent to LAN II from the bridge 1 circulates LAN II, the row indicated by the strip pointer 56 matches the row of the matching SA address detected by (or in) the comparator 53. However, if a bit error is generated, the self apparatus address SA cannot be extracted from the received transfer frame and the strip pointer 56 cannot be updated. Therefore, when another transfer frame is received later without error, the row indicated by the comparator 53 is beyond the row indicated by the strip pointer 56 by the number of transfer frames which generated an error. The bit error of a received frame is detected by MPU 20 with the frame check sequencer (FCS) bit in the frame. The received frame generating an error is deleted from the LAN, namely it is stripped.

Accordingly, if the rows of SA management table 50, in which the self apparatus address SA of the transfer frame generating an error is stored, are not cleared, the self apparatus addresses of the transfer frames which are already deleted from the LAN remain and, in the worst case, the SA management table 50 overflows. In order to eliminate such a situation, the row indicated by the strip pointer 56 up to and including the row of address matching indicated by the comparator 53 are cleared by the comparator 53. Such rows in the control flag memories 51 are reset by the comparator 53.

The comparator 53, detecting a match of self apparatus addresses, informs MPU 20 of the matching addresses. The MPU 20, receiving such notification, requests that the transmitting controller 36 strip the received transfer frames. When such a request is issued to the transmitting controller 36, the selector 39 selects the pattern generator 37 instead of the frame receiver 3 and the received transfer frame is deleted from LAN II.

In this first embodiment, the self apparatus address of the received frame and each registered address of SA management table 50 are sequentially compared in the comparator 53 as shown in FIG. 7. This comparison may be simultaneously performed in parallel. The comparison method is selected considering the circuit structure, the scale of the circuit and the time required for comparison processing.

Furthermore, in this first embodiment, when the self apparatus address of a received transfer frame matches the registered address, the frame is ordinarily deleted in both the address memory 52 and the control flag memory 51. Alternatively it is possible to erase (reset) the frame only by operation of the control flag memory 51. It is also possible that a timer area can be provided to the control flag memory 51 of the SA management table 50 and the self apparatus address management table circuit 49 so that an erasing process is carried out to the relevant rows during a timeup period after a constant period from address registration. In this case, it is preferable that the timeup period be set a little longer than the time required for the transmitting frame to circulate in LAN II. Namely, if a bit error is generated while the transmitting frame is circulating in LAN II, the corresponding registered row is deleted at the second circulation. Therefore, it is possible to avoid a failure caused by the SA management table 50 being filled with registered data due to accumulation of bit errors.

Figure 8:
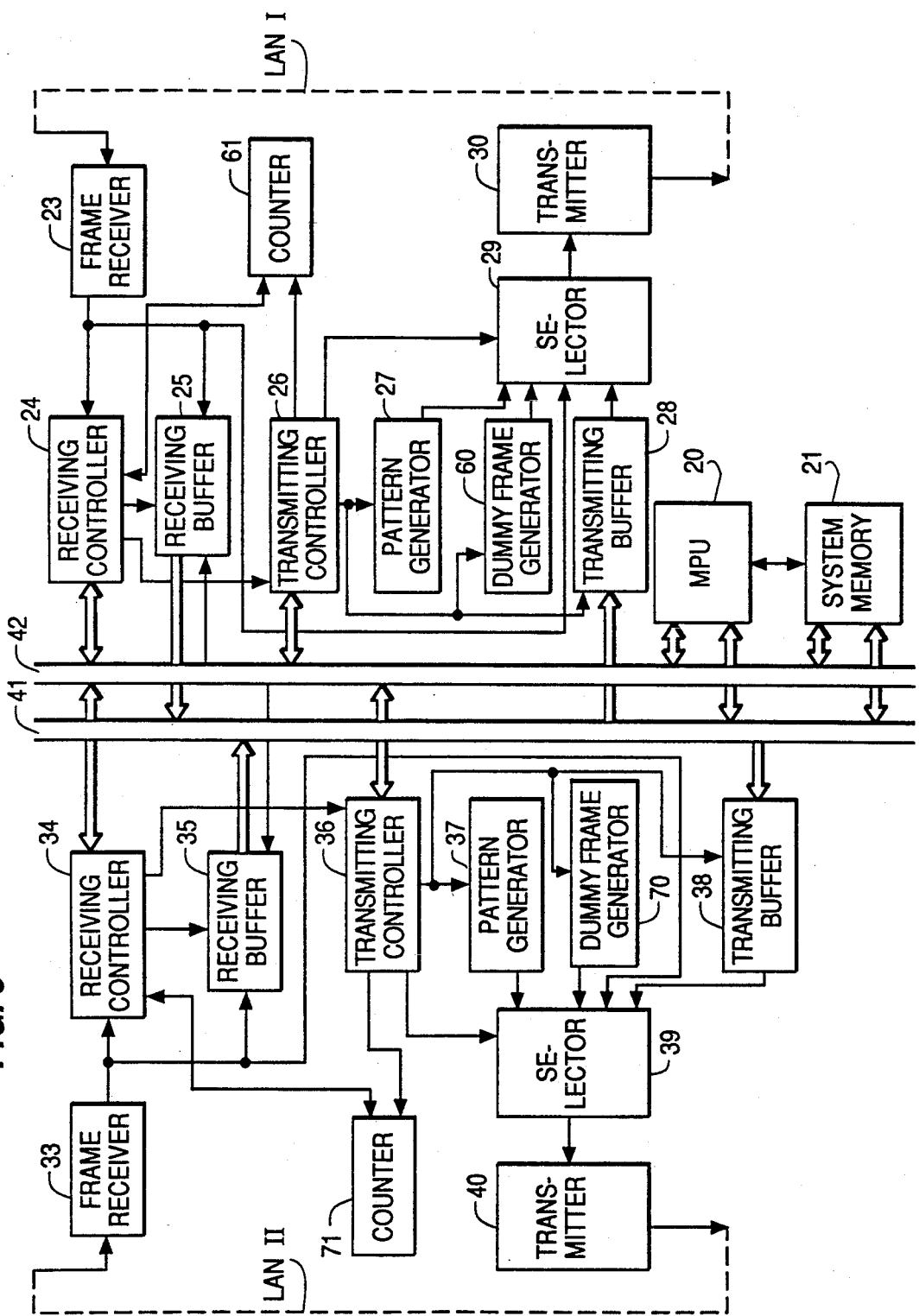
FIG. 8 is a block diagram of a connection system between different networks according to a second embodiment of the present invention.

A block diagram of the internetwork connecting unit in a second embodiment of the present invention is shown in FIG. 8. The embodiment of FIG. 8 shows a structure of the bridge 1 in the mutually connected network as shown in FIG. 5 and the elements like those in FIG. 5 ar given similar reference numerals.

In FIG. 8, through receiving buffer 25 and bus 41, the frame receiver 23 can directly send the received frame to the frame transmitter 30 via the selector 29 and can send the received frame to MPU 20 and system memory 21. The frame receiving controller 24 analyzes the received frames circulating in LAN I. Moreover, the frame receiving controller 24 provides the function of acquiring the tokens circulating in LAN I and the function of detecting dummy frames described later.

The transmitting controller 26 provides the functions of monitoring reception of dummy frames and notifying the number of frames to be transmitted or received following the dummy frames to a transmitting frame number counter 61 and controls the timing for deleting the frames. The dummy frame is generated by a dummy frame generator 60.

Figure 9:
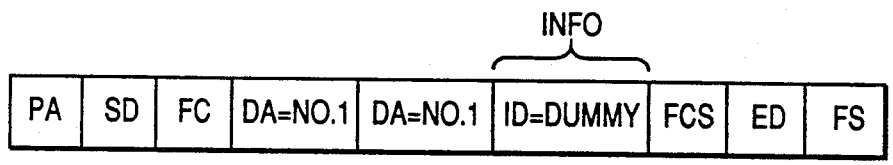
FIG. 9 is a frame format of dummy frames employed in the system or FIG. 8.

FIG. 9 is a frame format of the dummy frame. The dummy frame contains the distant apparatus (destination node) address DA and self apparatus (start node) address SA set to the address of node 1 and also an ID code in the area corresponding to the information part INFO set to indicate that this frame is a dummy frame. Using this format, the dummy frame can be distinguished from a frame returning to the self node from the self node, used for testing.

The transmitting frame number counter 61 counts up a transmitting and receiving frame number. It provides the function of, during transmission, counting up the number of data frames transmitted following the dummy frame and, during reception, counting down the number of data frames transmitted from the self apparatus, received following the dummy frame. The frame receiving controller 34, frame transmitting controller 36, dummy frame generator 70 and sending frame number counter 71 also provides the same functions as those of respective circuits described for the ring-type LAN II and therefore explanation of these circuits is omitted.

Figure 10:
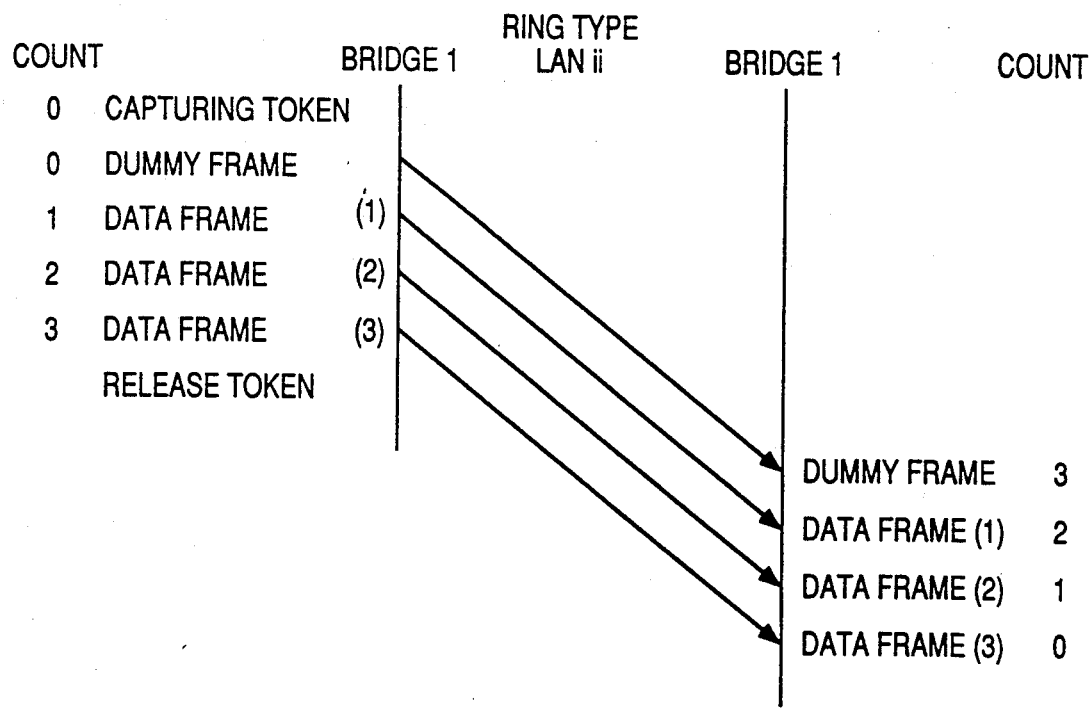
FIG. 10 is an illustration describing a sequence for transmitting and/or receiving a dummy frame in the system of FIG. 8.

The frame transmitting sequence in the bridge 1 and an example of the counter value are shown in FIG. 10. The time axis is plotted in the vertical direction with time passing in the downward direction. The oblique arrow marks indicate that the transmitting frame for the self apparatus circulates the ring and is received by the self apparatus. Accordingly, the left side nodes and right side nodes are both accommodated in the same node, bridge 1 and the count value is also the same.

Figure 11:
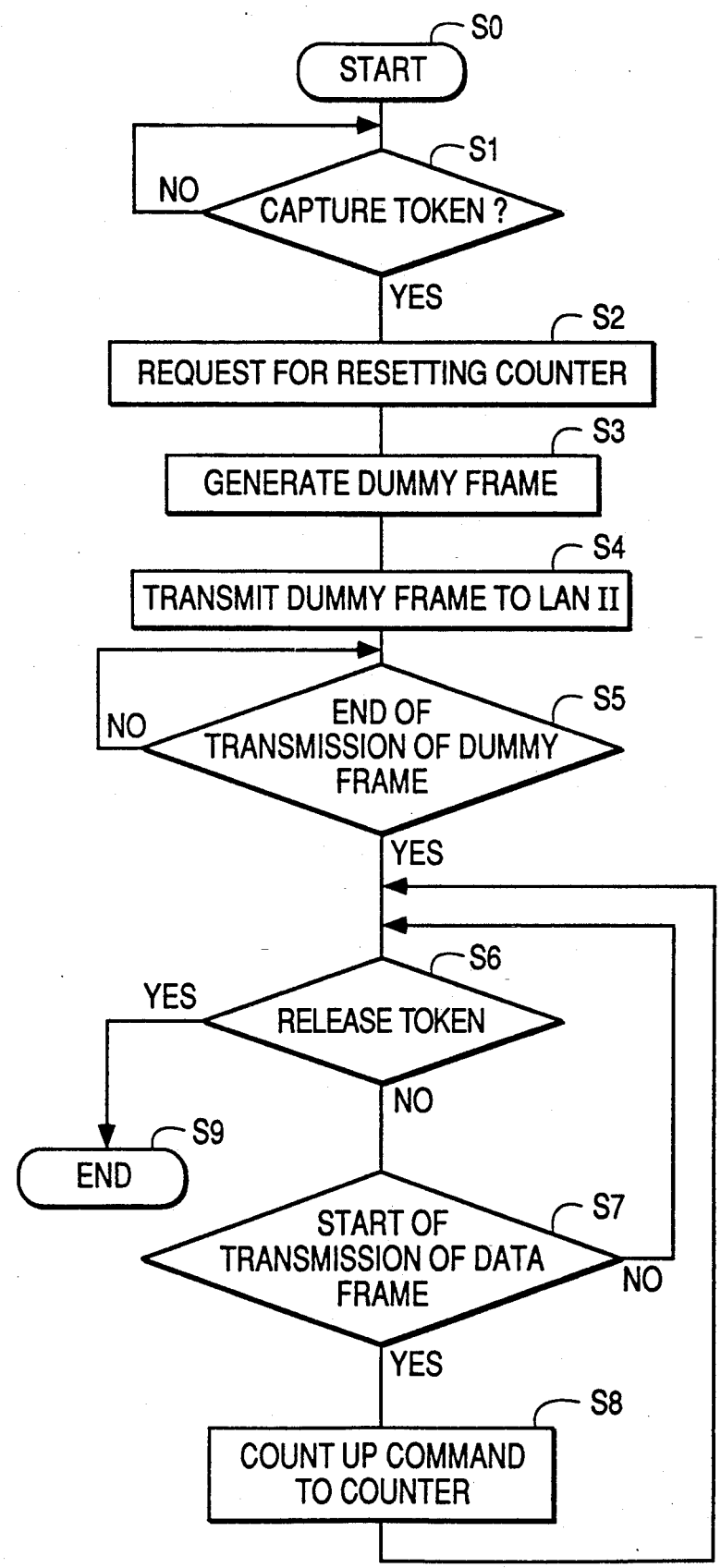
FIG. 11 is a flow chart illustrating transmission of a dummy frame in the system of FIG. 8.
Figure 12:
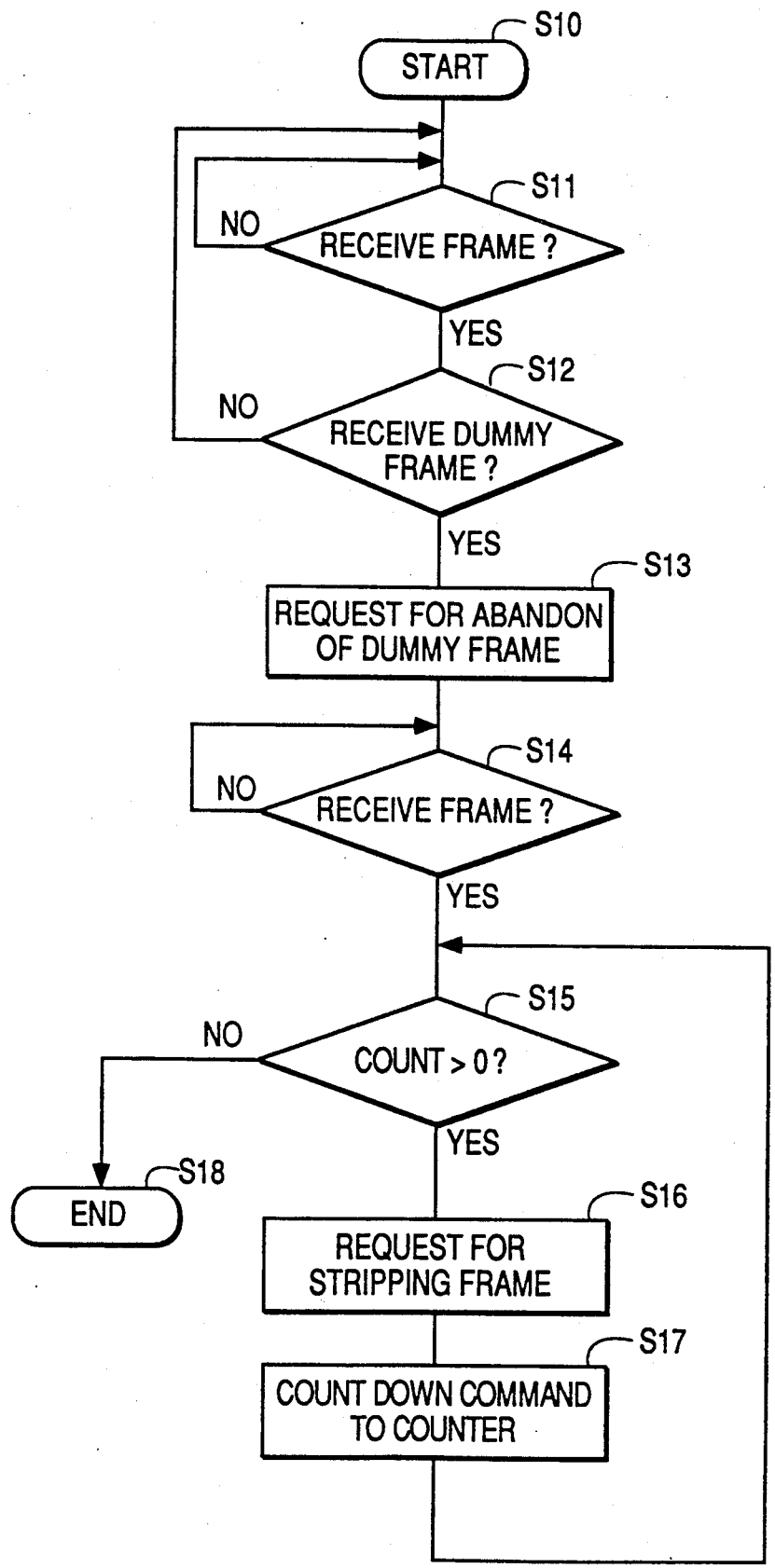
FIG. 12 is a flow chart illustrating reception of a dummy frame in the system of FIG. 8.

The flow of transmission processing procedures for transmission of dummy frames in the bridge 1 is shown in FIG. 11 and the flow of reception processing procedures is shown in FIG. 12. An example is provided for frame transmission to node 5 of ring-type LAN II from node 3 of ring-type LAN I. The frame circulating through LAN I is received by the frame receiver 23 of the bridge 1 and is then sent to the frame receiving controller 24. The receiving controller 24 notifies MPU 20 of the distant apparatus (destination node) address (DA=No. 5), the self apparatus (start node) address (SA=No. 3), and the information INFO as the frame data through the buses 41 and 42. MPU 20 checks whether the received frame is the internetwork transfer frame designated for transfer to the LAN II from the LAN I by making reference to the information stored in the system memory 21.

In the event an internetwork transfer frame is received, the transfer frame is transferred to system memory 21 from the receiving buffer 25. MPU 20 converts the frame format of this transfer frame into that for LAN II, and transmits this transfer frame to LAN II depends on the procedures of the flow chart of FIG. 11. First, the frame transmitting controller 36 monitors whether the frame receiver 33 has acquired the token providing the right of transmission in LAN II (step S1). When the frame receiver 33 has obtained the right of transmission (token), it resets a count value by issuing a reset request to the transmitting frame number counter 71 (step S2).

Next, the frame transmitting controller 36 starts the dummy frame generator 70, controls the selector 39 to select the output of the dummy frame generator 70 instead of the frame receiver 33, and then outputs from selector 39 a dummy frame having the format shown in FIG. 9. Namely, the frame transmitting controller 36 controls generation of a dummy frame setting the distant apparatus node addressed DA to the self node address (in this case, the address of node 1), Prior to transmission of a transfer frame stored in the transmitting buffer 38 and converted from the frame format of LAN I to that of LAN II by MPU 20, the generated dummy frame is transmitted to LAN II through the selector 39 and frame transmitter 40 (step S4).

Thus, the frame transmitter 40 starts transmission of the dummy frame sent from the dummy frame generator 70 to the LAN II. The frame transmitting controller 36 monitors transmission of the dummy frame from the dummy frame generator 70. Upon completion of transmission of the dummy frame (step S5), the frame transmission controller 36 controls the selector 39 to output the data frame, designating LAN II which is stored in the transmitting buffer memory 38, to the frame transmitter 40 which transmits the data frame to LAN II. This data frame is the internetwork transfer frame received by the frame receiver 23 of LAN I in which the distant apparatus node address DA corresponds to the node address (for example, No. 5) in LAN II and the self apparatus node address SA corresponds to the node address (for example, No. 3) in LAN I, as a result of only the format conversion by MPU 20.

The frame transmitting controller 36 monitors transmission of a data frame from the transmitting buffer memory 38 and issues an instruction (step S7) to the transmitting frame number counter 71 to increase the counter value one by one for each transmission of one data frame. This operation is repeatedly carried out until the transmission of all data in the transmitting buffer memory 38 is complete. When the time limit for holding the token assigned to the bridge 1 has passed, before or after completion of the end of transmission of all data, the token of LAN II (right of access) is released (step S6), completing the transmitting operation. With such operations, after transmission of the dummy frame, the number of data frames transmitted continuously following the dummy frame are counted by the transmitting frame number counter 71.

The receiving operations are now explained in conjunction with the flow chart of FIG. 12. Frame receiver 33 of bridge 1 receives the dummy frame transmitted from the bridge 1 after circulation through LAN II. The frame receiving controller 34 monitors (step S11) the frames received through the frame receiver 33 and notifies the frame transmitting controller 36 when the received frame is the dummy frame shown in FIG. 9. The frame transmitting controller 36 then instructs the frame transmitter 40 to abandon the received dummy frame, namely deleting the dummy frame stored in the receiving buffer 35 (step S13). Selector 39 is switched to select the pattern generator 37 instead of the frame receiver 33, and then stripping of the received dummy frame is carried out.

In case the frame receiving controller 34 receives a data frame transmitted following the dummy frame, the frame receiving controller 34 issues (step S16) a frame deletion (stripping) request to frame transmitting controller 36 if the content of transmitting frame number counter 71 is not zero (step S15) and simultaneously issues an instruction to the transmitting frame number counter 71 to decrease one by one the count value thereof (step S14). Upon reception of the frame deletion request, frame transmitting controller 36 starts stripping the received frame as described with reference to FIG. 5 and controls the selector 29 and the pattern generator 37 for the stripping.

The operations described above are repeated until the count value of the transmitting frame number counter 71 becomes zero (steps S15, S17) and when the count value becomes zero, processing is completed (step S18). Thereby, the internetwork transfer frame from LAN I transmitted to LAN II following the dummy frame during the transmission can be deleted by the bridge 1 after circulation through the ring without making reference to the self apparatus node address SA.

The transfer of the data frame to LAN II from LAN I has been explained above, but the operations of LAN I circuits for transfer of data frame to LAN I from LAN II are also the same as those explained above.

Figure 13:
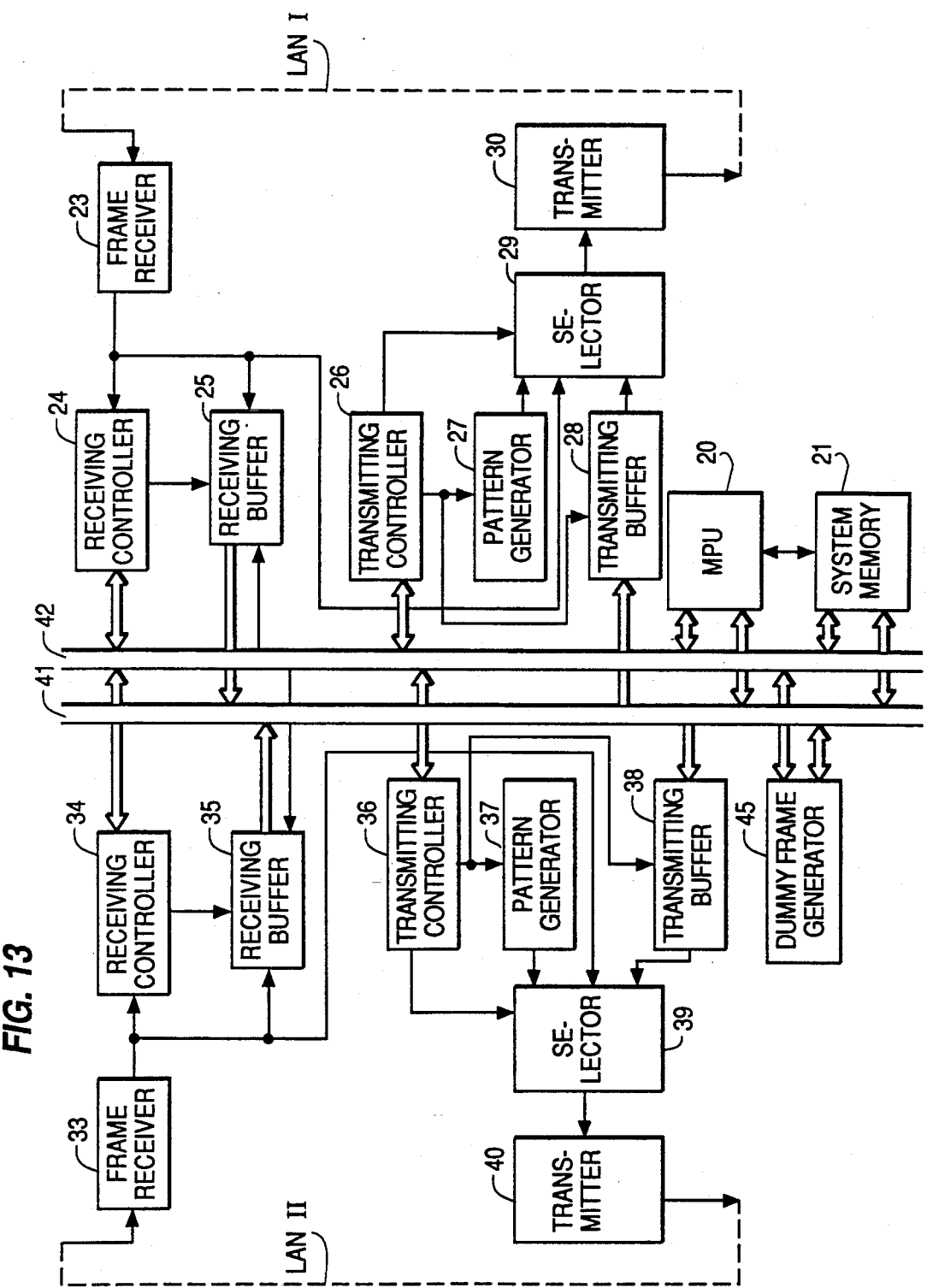
FIG. 13 is a block diagram for a connection system between different networks according to a third embodiment of the present invention.

FIG. 13 is a block diagram of the internetwork connecting unit in a third embodiment of the present invention. A dummy frame generator 45 generates first and second dummy frames. The frame format of a dummy frame in the third embodiment is similar to that explained with reference to FIG. 9. The frame transmitting controllers 26 and 36 transmit at least one transfer frame after transmission of the first dummy frame and thereafter control the dummy frame generator 45 and selectors 29, 39 in order to transmit the second dummy frame. The frame receiving controllers 24, 34 detect the first and second dummy frames in the frame received by the frame receivers 23, 33.

MPU 20 controls the frame transmitting controllers 26, 36 on the basis of the detection result of the frame receiving controllers 24, 34 to delete (strip) the received transfer frames interposed between the first dummy frame and the second dummy frame.

Figure 14:
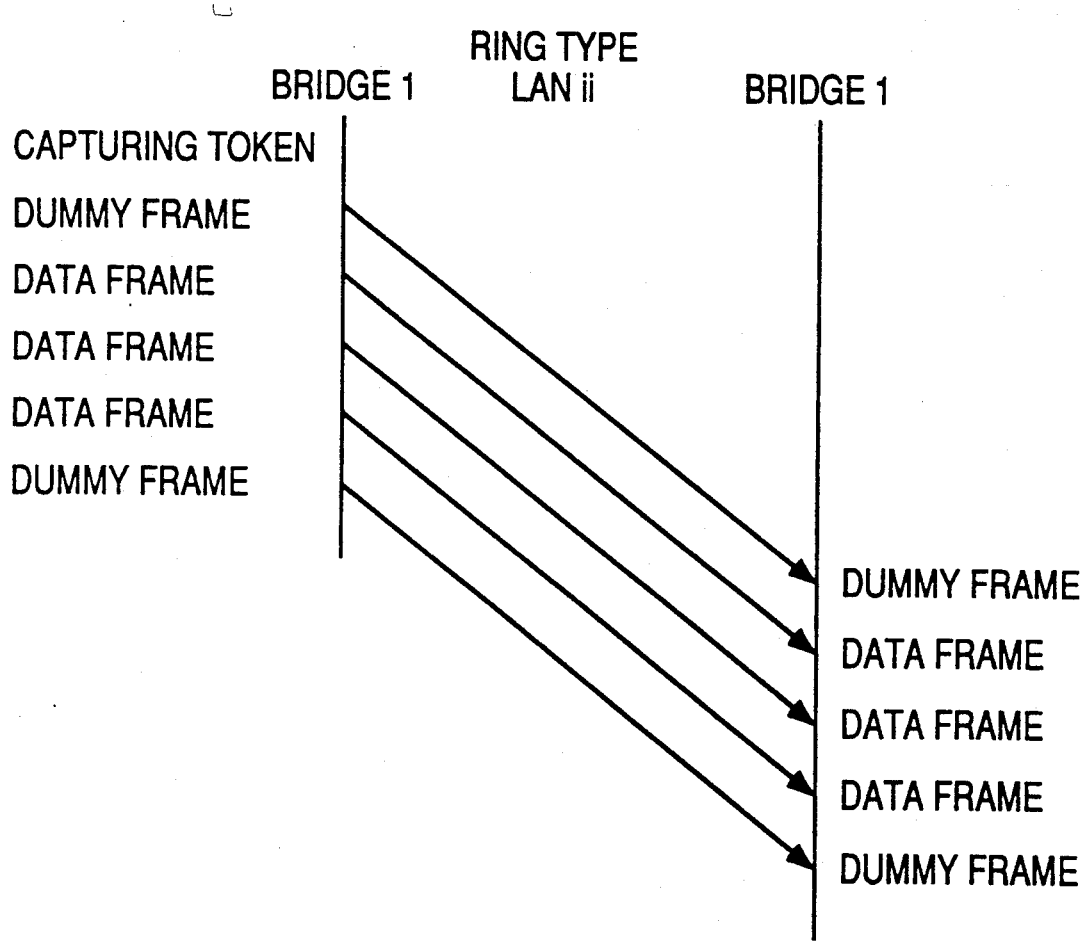
FIG. 14 is an illustration describing a sequence of transmitting/receiving first and second dummy frames in the system of FIG. 13.

With reference to FIG. 14, operations of the block diagram of FIG. 13 are explained. FIG. 14 shows an example of the frame transmission sequence in the bridge 1, the left side and right side of FIG. 14 indicating the same bridge 1. In FIG. 14, the time axis is plotted in the vertical direction with time passing in the downward direction. The oblique arrow marks show that the transmitting frame from the self apparatus (bridge 1) is received again by the self apparatus after circulation through the ring.

Figure 1:
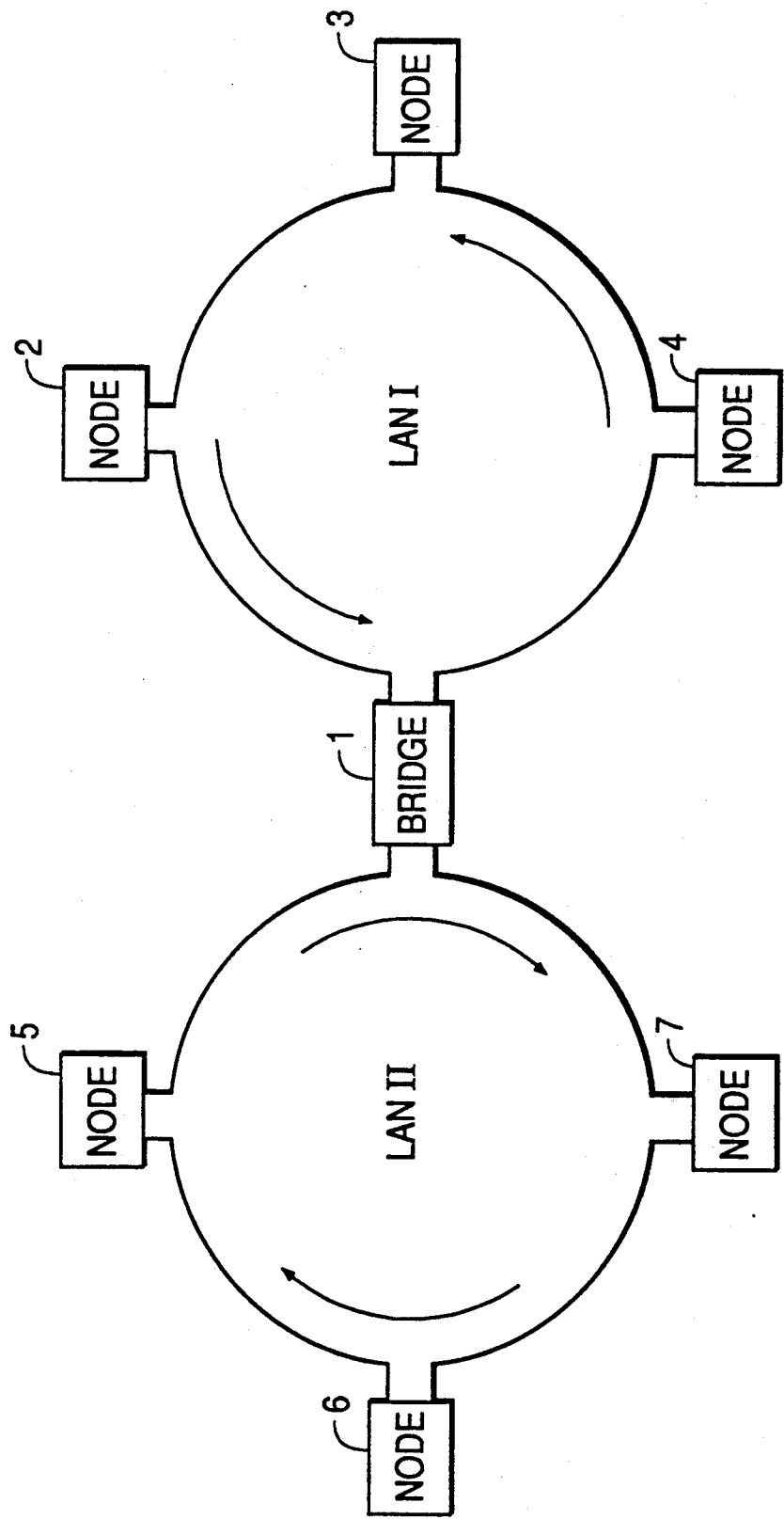
FIG. 1 is a prior art block diagram of a system configuration connecting different local area networks.
Figure 2:
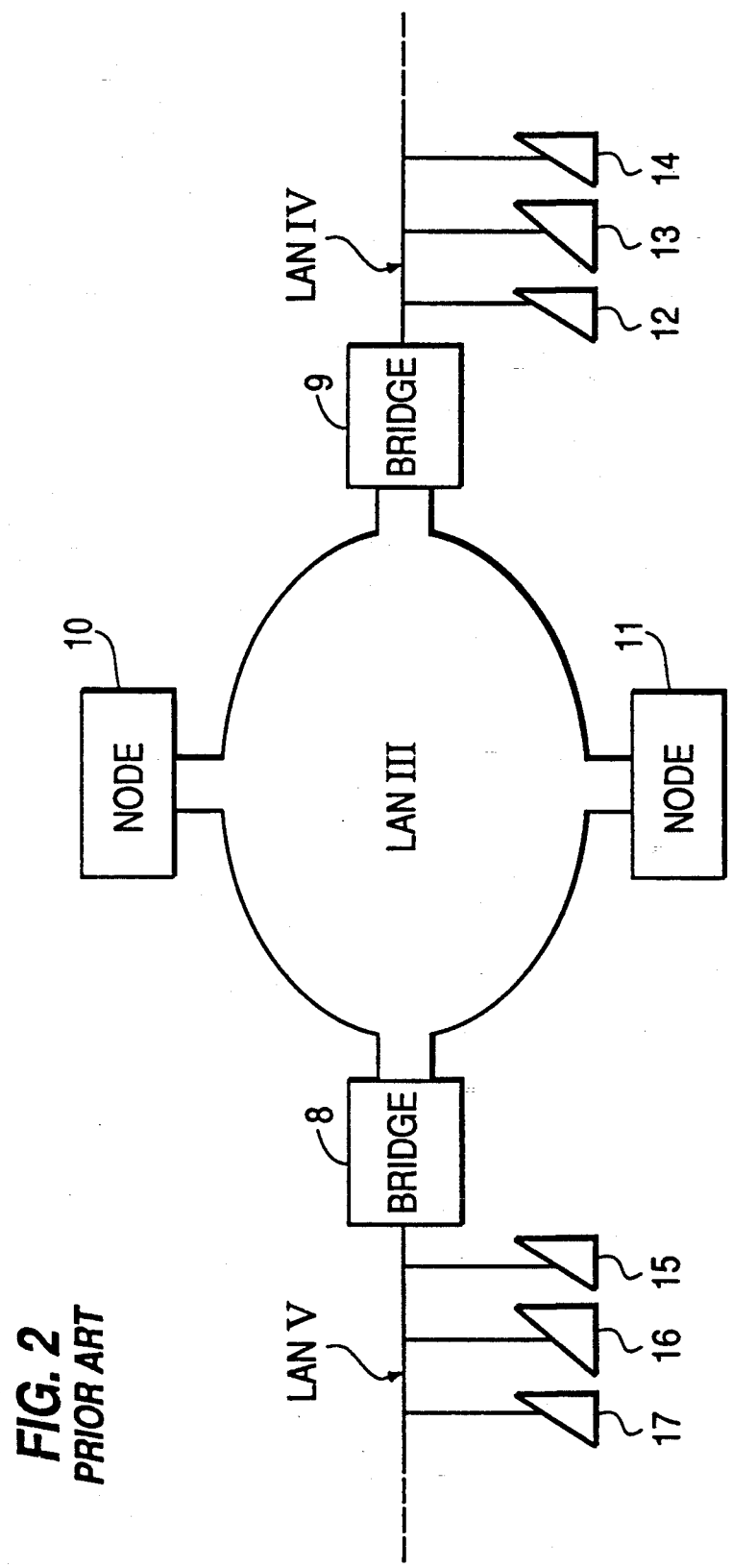
FIG. 2 is a prior art block diagram of another system configuration connecting different local area networks.
Figure 15:
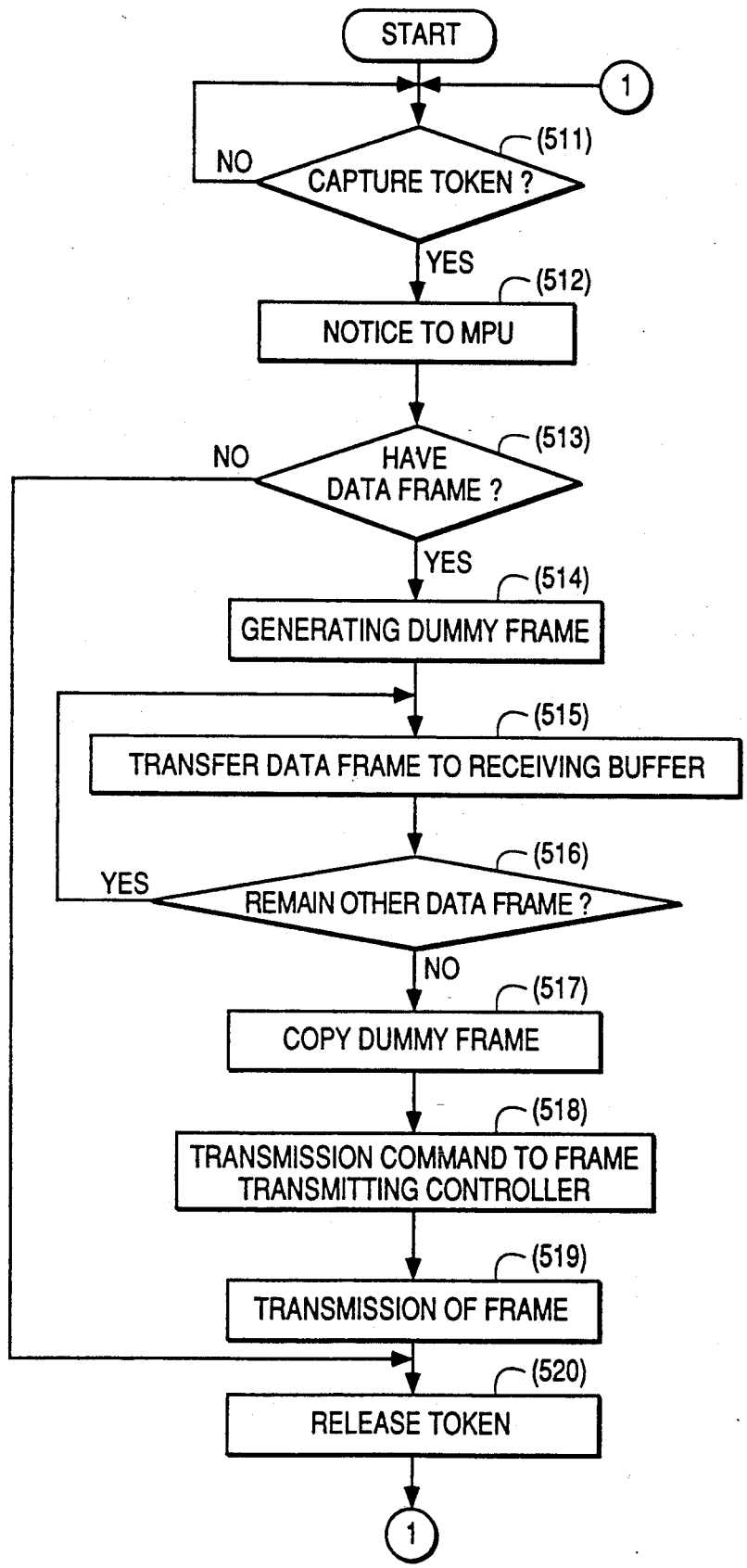
FIG. 15 is a flow chart illustrating transmission of first and second dummy frames in the system of FIG. 13.
Figure 16:
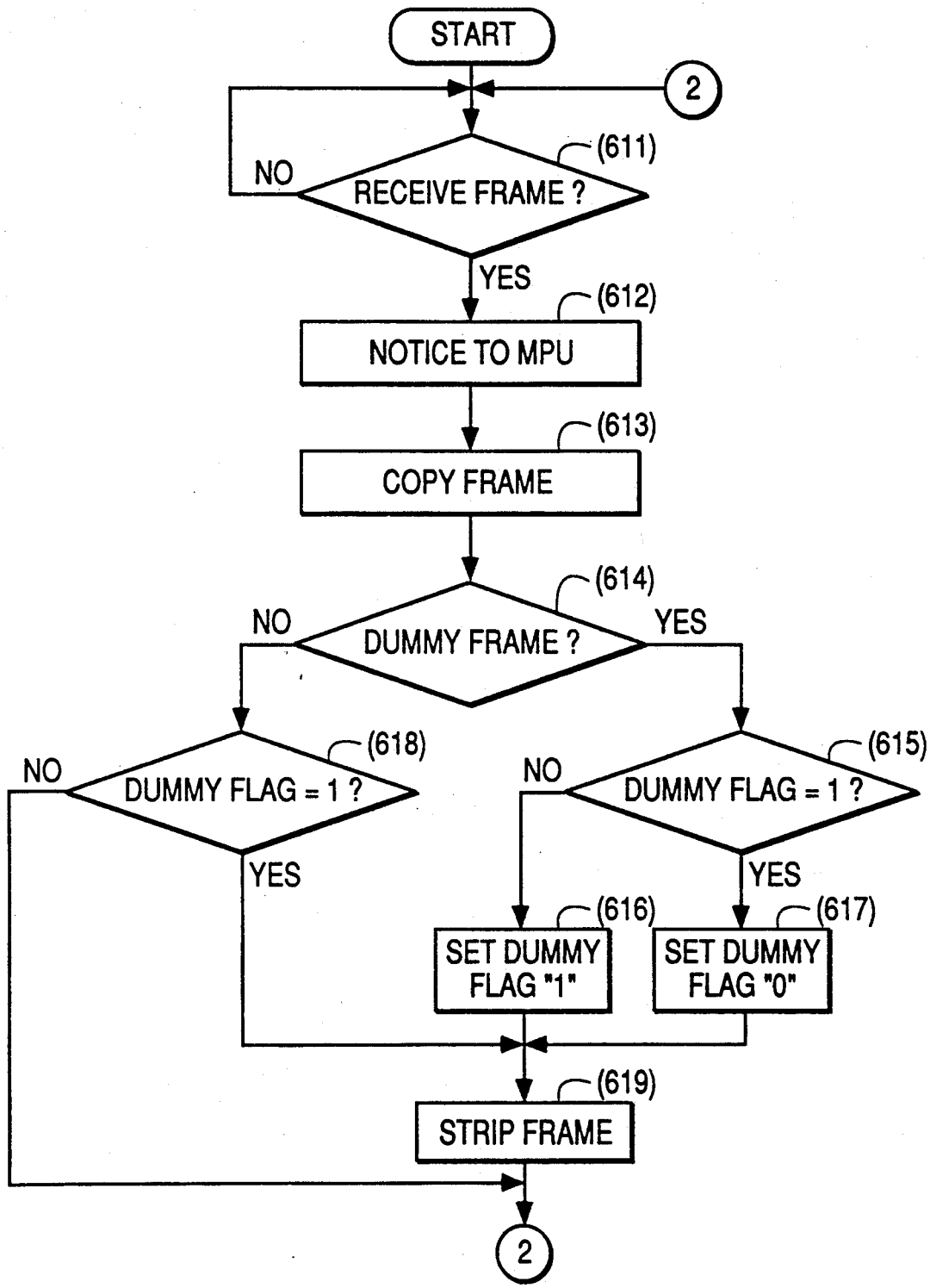
FIG. 16 is a flow chart illustrating reception of first and second dummy frames in the system of FIG. 13.

The flow of the transmitting processing procedure in the bridge 1 is illustrated in FIG. 15 and the flow of the receiving processing procedure is illustrated in FIG. 16. An example is provided for frame transmission to node 5 of ring-type LAN II from node 3 of ring-type LAN I as exemplified by FIG. 1. The frame circulating through LAN I is received by the frame receiver 23 and frame receiving controller 24 of the bridge 1. The distant apparatus (destination node) address (DA=No. 5), the self apparatus (start node) address (SA=No. 3), and the information INFO of this frame are extracted and supplied to MPU 20 through the buses 41, 42. MPU 20 then checks whether the received frame is the transfer frame designated for transfer to LAN II from LAN I by making reference to the system memory 21. When the received frame is the transfer frame, it is stored in the system memory 21 after format conversion.

Frame data is transmitted to the LAN II by the procedure illustrated in the flow chart of FIG. 15. First, the frame receiving controller 34 monitors whether the token which indicates the right of transmission in LAN II has been obtained or not (step 511) and repeats loop until the a token can be obtained. When the token is acquired, reception of the token is informed to the microprocessor MPU 20 from the frame receiving controller 34 (step 512). Next, the microprocessor MPU 20 decides whether the data frame to be transmitted exists in the system memory 21 (step 513). When there is no data frame to be transmitted (a negative decision) in step 513, the acquired token is released (step 520), completing the transmitting process. When the token is released in the step 520, processing returns to step 511.

When existence of a data frame is decided (an affirmative decision) in the step 513, the microprocessor 20 starts the dummy frame generator 45 and copies the dummy frame in the transmitting buffer memory 38 (step 514.) This dummy frame has the structure shown in FIG. 9 and both the distant apparatus (destination node) address DA and self apparatus (start node) address SA are set to the address (No. 1) of node 1.

The microprocessor 20 transfers the data frame to be transmitted to the transmitting buffer memory 38 (step 515). The system memory 21 stores a plurality of format-converted data frames (for example, three frames) to be transmitted to node 5 from node 3, and the microprocessor 20 reads one of these frames to store it in the transmitting buffer memory 38. In the case of this data frame, the distant apparatus node address DA is set to No. 5 and the self apparatus node address SA to No. 3. This data frame is the frame itself transmitted from node 3.

Next, the microprocessor 30 decides (step 516) whether the remaining data frames to be transmitted exist in the system memory 21. In case there is a remaining data frame, the affirmative decision is made and the processing loops back to the start of step 515 (transfer of data frame).

When the negative decision is made because there is no remaining data frames, the microprocessor 20 starts the dummy pattern generator 45 and copies the dummy frame in the transmitting buffer memory 38 (step 517). Next the microprocessor 20 sends a command for transmission (step 518) to the frame transmitting controller 36 which controls the output of the frame stored in the transmitting buffer memory 38 in response to this command for transmission of the frame to LAN II (step 519). After the transmission of the frame, the token is released (step 520). With the above frame transmission method, the one dummy frame and three data frames are transmitted as shown in FIG. 14 and thereafter the one dummy frame is transmitted again.

In accordance with the flow chart of FIG. 16, operations for receiving and deleting the frames transmitted as described above will be explained. First, the frame receiving controller 34 monitors reception of frames (step 611). When the receiving controller 34 detects reception of a dummy frame, the frame receiving controller 34 notifies the microprocessor 21 (step 612). The received frames are copied in the receiving buffer 35 (step 613) through the buses 41, 42.

When the MPU 20 is notified that a dummy frame has been received (affirmative decision in step 614), the MPU 20 decides whether the dummy flag in the system memory 21 is set to "1" (step 615). This dummy flag indicates existence or non-existence of the dummy frame and is changed to "1" or "0" for every reception of a dummy frame. When a series of frames (one dummy frame, three data frames and one dummy frame) are transmitted from the transmitting buffer 38, the dummy flag is set to a "0". When the first dummy frame is received, since the dummy flag is set to "0", a negative decision is made in step 615. The microprocessor 20 therefore sets the dummy flag to "1" (step 616) and thereafter sends the transmitting frame deleting instruction to the frame transmitting controller 36 (step 619). The frame transmitting controller 36 deletes the received dummy frame as described with respect to FIG. 5. Thereafter, processing returns to step 611 for repetition.

In case the reception of a data frame is detected in the frame receiving controller 34, a negative decision is made in step 614 for the question of whether the received frame is a dummy frame. The microprocessor 251 then decides whether the dummy flag is set to "1" and carries out the processing step 619 (deletion of frame) when an affirmative decision is made in step 618. When the three data frames are received after the first dummy frame, an affirmative decision is made in step 618 and the three data frames are deleted in step 619.

When the second dummy frame is received following the three data frames, the affirmative decision is made in the step 614 for the question of whether the received frame is a dummy frame and an affirmative decision is made in step 615 or the question of whether the dummy flag is set to "1".

Next, the microprocessor 20 sets the dummy flag to "0" (step 617) and thereafter the frame is deleted in the step 619.

When an ordinary frame (transferred between nodes connected to the same LAN) is received, a negative decision is made in steps 614 and 618. Therefore, the received frame is not deleted and instead is transferred through the frame receiver 33, selector 39 and frame transmitter 40, and the processing after step 611 is repeated.

In the case of internetwork transfer of frames through the bridge 1 in the third embodiment, the dummy frames are transmitted before and after the data frame to be transferred. The microprocessor 20 monitors the frames received by the frame receiving controller 34 and deletes one or a plurality of data frames interposed between two dummy frames.

Therefore, it is no longer necessary to change the format of data frames to be transferred and a plurality of data frames can be transferred continuously. Moreover, the present invention assures flexible modification of a network without influence of changes in a number of nodes.

What is claimed is:

1. An interloop bridge for internetwork communication between a first local area network and a second local area network, the second local area network being a token ring-type local area network, said interloop bridge comprising:
    a transmitter to transmit, to the second local area network, a first dummy frame followed by at least one transfer frame; and
    a detector to detect the first dummy frame after transmission around an entirety of the second local area network and to delete the at least one transfer frame immediately following detection of the first dummy frame.

2. An interloop bridge as recited in claim 1, wherein said transmitter transmits a second dummy frame to the second local area network following the at least one transfer frame, and
    wherein said detector detects the second dummy frame received after circulation through the second local area network and deletes one or more transfer frames received during a period between reception of the first dummy frame and reception of the second dummy frame.

3. An interloop bridge as recited in claim 1, wherein said transmitter comprises an identifier to identify a number of transfer frames to be transmitted after transmission of the first dummy frame, and
    wherein said detector deletes as many of the transfer frames, received following the first dummy frame, as specified by said identifier.

4. An interloop bridge as recited in claim 3, wherein said identifier comprises a counter to count the number of internetwork transfer frames transmitted and received.

5. An interloop bridge as recited in claim 4, wherein said counter, beginning at zero, increments for each transmitted transfer frame and decrements for each later received transfer frame, and
    wherein said detector completes deleting received transfer frames when said counter decrements to zero.

6. An interloop bridge as recited in claim 1, wherein said transmitter transmits data in the at least one transfer frame defining a node of the first local area network by a self apparatus address and defining a node of the second local area network by a distant apparatus.

7. An interloop bridge for internetwork communication between a first local area network and a second local area network, the second local area network being a token ring-type local area network, said system comprising:
    a memory;
    a transmitter to transmit, to the second local area network, a transfer frame, the transfer frame comprising a distant apparatus address, and to store the distant apparatus address of the transfer frame in said memory; and
    a detector to detect the transfer frame after transmission around an entirety of the second local area network and to delete the transfer frame when the distant apparatus address of the transfer frame received from the second local area network matches the distant apparatus address stored in said memory.

8. An interloop bridge as recited in claim 7, wherein said transmitter transmits data in the transfer frame defining a node of the first local area network by a self apparatus address and defines a node of the second local area network by the distant apparatus address.

9. An interloop bridge as recited in claim 7, wherein said detector comprises a comparator for comparing a received transfer frame with at least one stored frame to recognize a match.

10. An interloop bridge as recited in claim 9,
wherein each of the at least one stored frame includes a flag indicating transfer frames that have been transmitted and not yet received, and
wherein said comparator compares the received transfer frame with the at least one stored frame when the flag therein indicates that a transfer frame corresponding thereto has been transmitted and not yet received.

11. A method for internetwork communication in an interloop bridge between a first local area network and a second local area network, the second local area network being a token ring-type local area network, said method comprising the steps of:
(a) transmitting, from the interloop bridge to the second local area network, a first dummy frame followed by at least one transfer frame;
(b) detecting the interloop bridge the first dummy frame after transmission around an entirety of the second local area network; and
(c) deleting the at least one transfer frame immediately following detection of the first dummy frame at the interloop bridge.

12. A method as recited in claim 11, further comprising the steps of:
(d) transmitting a second dummy frame to the second local area network following the at least one transfer frame;
(e) detecting the second dummy frame received after circulation through the second local area network; and
(f) deleting the at least one transfer frame received during a period between reception of the first dummy frame and reception of the second dummy frame.

13. The method as recited in claim 11, further comprising the steps of:
(d) identifying a number of transfer frames to be transmitted after transmission of the first dummy frame; and
(e) deleting as many transfer frames, received following the first dummy frame, as specified by the number of the transfer frames identified in step (d).

14. A method as recited in claim 13, wherein said identifying in step (d) comprises the step of counting the number of the transfer frames transmitted and received.

15. A method as recited in claim 14,
wherein said counting in step (d), beginning at zero, increments for each transmitted transfer frame and decrements for each later received transfer frame, and
wherein said deleting of received transfer frames in step (f) is complete when said count decrements to zero.

16. A method as recited in claim 11, wherein said method further comprises the step of (d) defining, prior to said transmitting in step (a), a node of the first local area network by a self apparatus address and a node of the second local area network by a distant apparatus address.

17. A method for internetwork communication in an interloop bridge between a first local area network and a second local area network, the second local area network being a token ring-type local area network, said method comprising the steps of:
(a) transmitting, from the interloop bridge to the second local area network, at least one transfer frame, the transfer frame defining at least a distant apparatus address;
(b) storing the distant apparatus address of the transfer frame at the interloop bridge;
(c) detecting at the interloop bridge the transfer frame after transmission around an entirety of the second local area network; and
(d) deleting the transfer frame at the interloop bridge when the distant apparatus address of the transfer frame received from the second local area network matches the stored distant apparatus address.

18. A method as recited in claim 17, wherein said step of transmitting data in the transfer frame further defines a node of the first local area network by a self apparatus address and defines a node of the second local area network by the distant apparatus address.

19. A method as recited in claim 17, further comprising the step of (e) assigning, to each of the at least one stored frame, a flag indicating transfer frames that have been transmitted and not yet received.

20. A method as recited in claim 19, further comprising the step of (f) comparing a received transfer frame with the at least one stored frame to recognize a match when the flag therein indicates that the transfer frame corresponding thereto has been transmitted and not yet received.

* * * * *

UNITED STATES PATENT AND TRADEMARK OFFICE
CERTIFICATE OF CORRECTION

PATENT NO. : 5,168,496
DATED : December 1, 1992
INVENTOR(S) : OHBA et al.

It is certified that error appears in the above-identified patent and that said Letters Patent is hereby corrected as shown below:

Col. 1, line 16, after "frame" insert --after--.

Col. 5, line 36, change "LAN II b" to --LAN II by--.

Col. 10, line 12, after "transmits" insert --it to transmitting buffer 38. A process for transmitting--.

Col. 12, line 24, after "repeats" insert --a--;
     line 26, delete "a" and combine line with line 25.

Col. 13, line 50, change "or" to --for--.

Col. 15, line 31, (claim 11), after "detecting" insert --at--.

Signed and Sealed this

Twenty-third Day of November, 1993

Attest:

BRUCE LEHMAN

Attesting Officer    Commissioner of Patents and Trademarks